73-152.
7-10-73   OR   3,744,307

United States Patent [19]
Harper et al.

[11] 3,744,307
[45] July 10, 1973

[54] PRESSURE GAUGE
[75] Inventors: James C. Harper; Robert P. Green, both of Tulsa, Okla.
[73] Assignee: Geophysical Research Corporation, Tulsa, Okla.
[22] Filed: June 28, 1972
[21] Appl. No.: 267,003

[52] U.S. Cl. .................................. 73/152, 73/395
[51] Int. Cl. ............................................. G01l 7/00
[58] Field of Search ...................... 73/151, 152, 391, 73/411, 392, 395

[56] References Cited
UNITED STATES PATENTS
3,232,115   2/1966   Bennett et al. ........................ 73/152

Primary Examiner—Donald O. Woodiel
Attorney—James R. Head and Paul Johnson

[57] ABSTRACT

In the wire line instruments used for measuring bottom hole pressure and temperature in deep bore holes in the earth, particularly wells used for the production of petroleum liquids and gases, a Bourdon tube is used as the pressure sensing element. This invention relates to an improved method of isolating the liquid inside of the Bourdon tube from the contamination of the well fluids, while still maintaining an accurate transmission of well fluid pressure to the Bourdon tube.

In place of the conventional bellows which has been used to isolate the Bourdon tube from the well fluids, this invention involves a long slender helical tubing which is connected to the Bourdon tube at its upper end and to the well fluids at its lower end. The volume of liquid inside the helical tube is several times the volumetric liquid flow of well fluids into the tubing so that contamination which may enter the bottom of the tubing never reaches the top. Means are provided for flushing out, from the top, the liquid in the helical tubing and for cleaning out from the bottom end, the contaminated well fluids which have been forced into the bottom of the tubing under the bottom hole pressure in the well.

4 Claims, 3 Drawing Figures

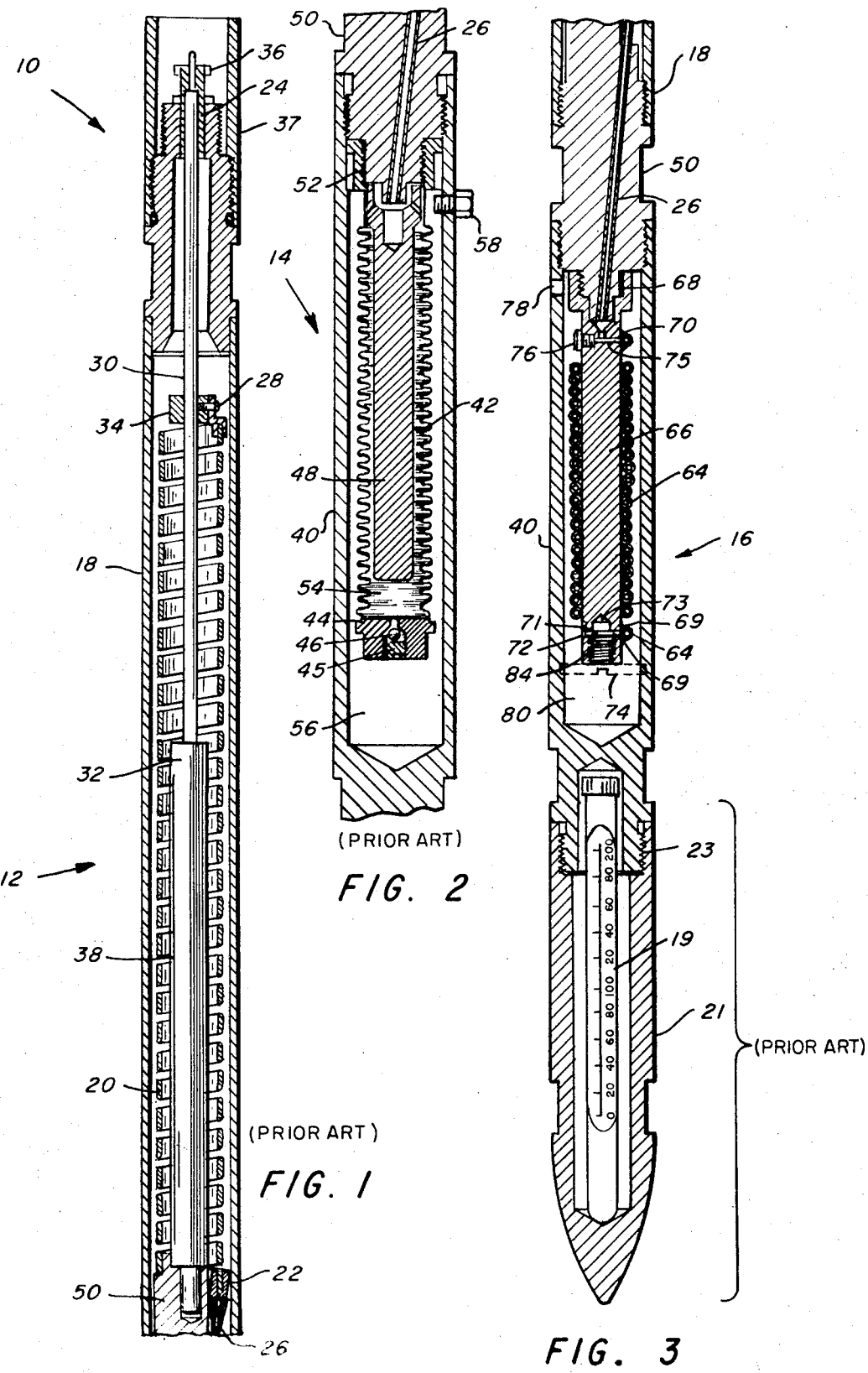
PATENTED JUL 10 1973
3,744,307
(PRIOR ART)
FIG. 2
(PRIOR ART)
FIG. 1
(PRIOR ART)
FIG. 3

PRESSURE GAUGE

BACKGROUND OF THE INVENTION

This invention is related to the measurement of bottom hole pressures and temperatures in deep bore holes in the earth. More particularly, it relates to an improvement in the conventional type of Bourdon pressure measuring and recording instruments. The improvement relates to means for communicating well fluid pressure to the Bourdon tube without introducing contaminated fluids into the Bourdon tube.

The prior art instruments generally comprise a tubular housing which comprises three separate portions or sections. One portion is for the recording means in which a sharp jeweled stylus scratches a line trace on the surface of a cylindrical sheet record. The second section is the pressure sensing section and this generally contains a long helically wound Bourdon tube, of many turns, that is anchored at its bottom end and is fastened to the recording stylus at its upper end. Changes of pressure in the hydraulic liquid inside the Bourdon tube causes the upper end to rotate with respect to the bottom end, and so to rotate the stylus against the recording chart. There is a clock-driven mechanism in the recording portion which moves the chart longitudinally so that a continuous curve is drawn of the pressure as a function of time.

The third section of the instrument is devoted to means for contacting the well fluids and transmitting the pressure of the well fluids to the hydraulic liquid in the Bourdon tube.

In the prior instrument this is done by using an extensible bellows, the interior of which communicates with the Bourdon tube and is filled with clean hydraulic liquid. The outside of the bellows is opened to contact with the well fluid, so that the pressure of the well fluid is communicated to the bellows which transmits the pressure to the hydraulic liquid inside, and thus to the Bourdon tube.

In general the well fluids are corrosive and contain many impurities such as mud, rock cutting, sand and other particles, and may contain hydrogen sulfide and some acids. In order to maintain the true fidelity of the Bourdon tube, it is important that there be no corrosion inside or outside of the tube. To ensure this a clean hydraulic liquid is used on the inside of the Bourdon tube and the outside is maintained in a liquid-free space shielded from the well fluids.

The bellows that is conventionally used to shield the pressure inside the Bourdon tube from the well fluid is a portion of the system that is very sensitive to corrosion and has a short life due to the many extensions and compressions, particularly when subjected to wide ranges of pressures in the environment of the corrosive, dirty well fluids.

SUMMARY OF THE INVENTION

In this invention the bellows is replaced by a long slender tubing of stainless material, that is coiled helically about a post inside of a case generally in the space formerly occupied by the bellows. The internal volume of this helical tubing is several times the actual change in volume of the Bourdon tube under the range of pressure measured in its use. Thus in the course of a pressure measurement, in going from atmospheric pressure to high bottom hole pressure, approximately one-third of the liquid in the helical tubing will move into the Bourdon tube. Also, since the bottom of the tubing is open to the well fluids, approximately one-third of the volume, that is, the lower one-third of the volume of the helical tubing will be contaminated by the entry of well fluids. Because of the length of this helical tubing and its internal volume in relation to the actual volume of well fluids entering, there is essentially no danger that well fluid contamination will move up the tubing to a point where it could endanger the cleanliness of the Bourdon tube. The design is such, that after use, the upper end of the helical tubing can be connected to a source of clean hydraulic liquid which can be used to flush out the liquid in the tubing, through the bottom end, and by doing so, sweep out the well fluid that has entered, and to wash out any contamination that might have been left in the tubing.

The principal object of this invention is therefore to provide a means for transmitting to the Bourdon tube, by means of a clear hydraulic liquid, the pressure in the bottom of the bore hole as represented by the pressure of the well fluid, without error in pressure transmission, and without contaminating the liquid inside of the Bourdon tube.

These and other objects of this invention and a better understanding of the principles and details of the invention will be evident from the following description taken in conjunction with the appended drawings, in which:

BRIEF DESCRIPTION OF THE DRAWINGS

FIG. 1 represents a part of the recording portion of the bottom hole pressure measuring instrument, and the sensing portion of the instrument.

FIG. 2 represents the pressure transmission and isolation portion of the instrument; and FIG. 3 represents the improved construction of this invention.

DESCRIPTION OF THE PREFERRED EMBODIMENT

Referring now to the drawings FIGS. 1 and 2 represent portions of the prior art instruments to which this invention is an improvement. Numeral 10 indicates generally the recording portion or section of the instrument. Numeral 12 indicates generally the sensing of pressure measuring section of the instrument and numeral 14 represents generally the pressure isolation portion of the instrument. Numeral 16 indicates the improved pressure isolation section of the instrument.

Numeral 18 indicates the case which surrounds the pressure sensing portion of the instrument. The pressure sensitive part is a long helical Bourdon tube 20 which is fastened securely at its bottom end to a clyindrical portion 50 of the case. There is a long central post 32 fastened to the portion 50 which supports, in a rotating manner, a slender stylus shaft 30. This shaft is rotated in bearings at point 32 in the post 38, the upper end of the stylus shaft 30 is journaled in a bearing 36. At an intermediate point there is a collar 34 which is fastened to the stylus shaft, and by means of screw 28 the upper end of the Bourdon tube is fastened to this collar so that as the Bourdon tube rotates at its upper end, the stylus shaft 30 will rotate with it and a stylus inside the recording section 10 will scribe a corresponding line on the record sheet (which is not shown but which is well known in the art). In the section 10 there is also a clock mechanism (not shown) which is designed to support a cylindrical sheet against which the stylus scribes a fine hairline. This sheet is adapted to move longitudinally as a function of time and the stylus will rotate in accordance with the pressure, as driven by the free end of the Bourdon tube. Thus a continuous curve can be drawn on the record sheet of pressure as a function of time. The stylus is such a fine point that by the use of a microscope, pressures can be measured to two-tenths of one percent by this means. Pressure gauges of this type are manufactured for sale by the Geophysical Research Corp. of Tulsa, Okla. 74106.

The lower end of the Bourdon tube is anchored at point 22 to the cylindrical portion 50 and there is a longitudinal tube 26 inserted into the portion 50. At its upper end this tube is connected to the interior of the Bourdton tube and at its lower end it is connected to the space inside of the bellows 42 which is fastened to the lower end of the cylindrical portion 50. The bellows 42 is closed at its bottom end by being fastened to a closure 44. There is an opening which is sealed by a ball 46 and screw 45. In operation the space inside of the bellows, the tube 26, and the Bourdon tube 20 are filled with clean hydraulic liquid, preferably under vacuum, so that all air is removed and except for the compression of the liquid, there will be no change in volume other than that due strictly to the pressure on the outside of the bellows. The space 54 inside the bellows is therefore filled with clean hydraulic liquid. A post 48 is provided to fill most of the interior space so as to limit the amount of hydraulic liquid required, and also to laterally guide the bellows.

An opening at the upper end of the case portion 40, which surrounds the bellows 43, is closed by a plug 58. The space 56 surrounding the bellows is kept filled with a clean liquid, which preferably includes a corrosion inhibitor which tends to retard the corrosive action on the bellows. The plug 58 serves to keep this liquid from leaking out of the casing when the instrument is out of the well. In use, the plug 58 is removed to permit direct pressure contact between the well fluids and the liquid inside the casing.

The fluid in the well is normally corrosive and usually contaminated with dirt, sand and drilling mud. The bellows arrgngement shown has been designed to prevent this well fluid from contaminiating the hydraulic liquid inside of the Bourdon tube. The bellows is not a fully satisfactory means of isolating the Bourdon tube from the well fluid because it has its own elastic effects, which act to restrain its movement under the pressure of the well fluid. Thus every time a bellows is changed it is necessary to recalibrate the gauge so that account can be taken of the elastic properties of the bellows itself. Furthermore, under the corrosive action of the well fluids and because of the mechanical action of the bellows in use, there are cracks and leaks formed, which may go undetected but which require frequent recalibration in use. There is also danger of complete failure of the bellows, which not only vitiates the instant measurement, but provides possible contamination of the measuring element or Bourdon tube.

It is important therefore to replace the bellows by a method of isolating the Bourdon tube from the well fluids which will clearly prevent contamination of the Bourdon tube and will in itself offer no pressure restraint, so that once the Bourdon tube has been calibrated it need not be recalibrated.

FIG. 3 except for the bottom portion, including parts 19, 21, 23, which are prior art, illustrates the improvement in bottom hole pressure measuring instruments of this invention. In place of the bellows which is fastened to the bottom end of the portion 50 of the instrument, there is a cylindrical post 66 fastened to the portion 50. Around this post 66 is formed, in a helix, a long slender tubing of stainless metal such as stainless steel. It is fastened by silver soldering at its upper end 70 and at its lower end 69. The ends of the tubing are plugged. Entry into the top end is by means of a drilled hole 75 at the top, which passes through the cylindrical rod 66 and enters the top end of the tubing. The exposed end of this drilled hole 75 is closed by means of a screw 76. The tubing 26 passing through the block 50 communicates with the drilled hole 75 and therefore with the upper end of the tubing 64 which is wound around the post 66.

At the lower end, a similarly drilled hole 71 communicates with the lower end of the tubing 64 and is closed, as by welding, at point 72. There is a longitudinally drilled hole 73 which is closed at the bottom end by means of a screw 74. This is drawn in dashed line since it is larger in diameter than the inner diameter of the casing 40 and must be removed before the instrument is placed in service. The casing 40 which surrounds the helical tubing, has an opening 78 at its top end. The space 80 inside the casing 40 is filled with clean liquid. Well fluids can communicate with this liquid in space 80 inside of the casing through opening 78. The clean liquid inside space 80 communicates with the liquid in tubing 64 through opening 73, since screw 74 is removed when in use. This screw 74 is to retain the hydraulic liquid which fills the helical tubing and the Bourdon tube and to prevent it from leaking out except when the instrument is in use. Consequently, when the instrument is to be lowered into the bore hole, the screw 74 is removed, the casing 40 is screwed to the portion 50 and space 80 is filled with clean liquid. The point of contact of the Bourdon tube with the well fluids is opening 78, but the pressure is transmitted through two buffer liquids, in the space 80 and in the tubing 64. As the instrument is lowered deeper into the bore hole the pressure of the well increases and well fluids then flow through the opening 78 into space 80, forcing clean liquid into the bottom end of the helical tubing 64, forcing clean hydraulic liquid up through the tubing 26 into the Bourdon tube causing it to expand and to rotate its upper end.

When the instrument is retrieved from the bore hole, reverse action takes place. The clean liquid flows out of the bottom of the tubing, back into space 80, and hopefully, forcing the well fluids out through opening 78. However, there may be some mixing of well fluids and clean liquid, so that particles of dirt or contamination may be left inside of the bottom end of the tubing 64. The tubing 64 is flushed out by removing screw 76 at the upper end of the tubing, attaching a pipe and forcing clean hydraulic liquid in through the opening 75 to the top of the coiled tubing 64 and out through the bottom. By flowing enough of this clean liquid through the tubing it will be cleaned out of all contamination. It is then left filled with clean hydraulic liquid by closing the screws 76 at the top and 74 at the bottom. A fine screen 84 is placed in the opening 73 so as to screen out particles of foreign matter.

There are a number of advantages of this invention over the prior art. It provides an improved method of separation of contaminating well fluids and the hydraulic liquid inside of the Bourdon tube. It causes no difference in the pressure inside of the Bourdon tube and in the well fluids. It provides an easy method of backflushing to clean out contamination that may be inside of the helical tubing as a result of the influx of well fluids. It replaces a fragile bellows portion of the assembly with a rugged long life tubing. The improvement has long life expectancy leading to very infrequent replacement. The improved portion can easily be replaced in the field when required and does not require recalibration of the gauge, as is the case when a bellows assembly is used. It can be used at any temperature where the Bourdon tube can be used but the bellows assembly might not be used because of its own restricted temperature limits.

While the invention has been described with a certain degree of particularity it is manifest that many changes may be made in the details of construction and the arrangement of components. It is understood that the invention is not to be limited to the specific embodiment set forth herein by way of exemplifying the invention, but the invention is to be limited only by the scope of the attached claim or claims, including the full range of equivalency to which each element or step thereof is entitled.

What is claimed:

1. In an instrument for use in deep bore holes for measuring the pressure in the well fluids, said instrument having a pressure sensing element filled with clean hydraulic liquid; the improvement comprising means to transmit to said sensing element the pressure of said well fluids while isolating said sensing element from contamination by said well fluids, comprising:
   a. a long, small-bore tubing filled with clean hydraulic liquid, a first end of said tubing connected to said sensing element, the second end of said tubing open to said well fluids, the internal volume of said tubing greater than the volume of fluid that will flow into said sensing element under the highest pressure to which it will be subjected; and
   b. means at said first end of said tubing for connection to a pressurized source of hydraulic liquid;
   whereby said pressurized hydraulic liquid can be used to backflush the hydraulic liquid out of said second end of said tubing, and with it any contamination that may have been left inside said tubing due to the influx of said well fluids into said second end.

2. The improvement as in claim 1 in which the internal volume of said tubing is at least three times the volume of liquid which will flow into said sensing element under the highest pressure to be measured.

3. The improvement as in claim 1 including means to close off said second end of said tubing except when said instrument is in use.

4. The improvement as in claim 1 in which said tubing is in the form of a small diameter helix.

* * * * *